United States Patent [19]

Ellison

[11] Patent Number: 5,053,145

[45] Date of Patent: Oct. 1, 1991

[54] DUAL DIRECTION TRANSFER SYSTEM FOR TRAMP OIL COLLECTION

[76] Inventor: Billy L. Ellison, 165 Santa Clara St., Brisbane, Calif. 94005

[21] Appl. No.: 518,358

[22] Filed: May 3, 1990

[51] Int. Cl.⁵ .................... C02F 1/40; B01D 17/025
[52] U.S. Cl. .................... 210/776; 210/804; 210/805; 210/806; 210/242.1; 210/242.3; 210/262; 210/195.1; 210/540; 134/104.2
[58] Field of Search ............... 210/776, 804, 805, 806, 210/242.1, 242.3, 262, 195.1, 540, 197; 134/104

[56] References Cited

U.S. PATENT DOCUMENTS

| | | | |
|---|---|---|---|
| 3,485,749 | 12/1969 | Reilly | 210/262 |
| 3,748,682 | 7/1973 | Rhodes | 15/229 R |
| 3,970,556 | 7/1976 | Gore | 210/169 |
| 4,132,645 | 1/1979 | Bottomley et al. | 210/540 |
| 4,614,582 | 9/1986 | Campitelli | 210/242.3 |
| 4,642,185 | 2/1987 | Turner et al. | 210/242.3 |
| 4,652,372 | 3/1987 | Threadgill | 210/242.3 |

OTHER PUBLICATIONS

Oil Skimmers Model 6-V; Oil Skimmers, Inc. 1982.

*Primary Examiner*—Stanley S. Silverman
*Assistant Examiner*—Neil M. McCarthy
*Attorney, Agent, or Firm*—Townsend and Townsend

[57] ABSTRACT

A dual direction transfer system for removing oil from an oily water source includes an oil separator mounted on a separator tank located so that its liquid level is above the liquid level of the oily water source, a dual direction transfer pipe through which flows the oily water and substantially oil free water in opposite directions, and a pump to force oily water from the source to the separator tank through the dual direction transfer pipe.

14 Claims, 5 Drawing Sheets

DUAL DIRECTION TRANSFER SYSTEM FOR TRAMP OIL COLLECTION

BACKGROUND OF THE INVENTION

This invention relates generally to removing oil from oily aqueous systems, and specifically to methods for removing tramp oil from aqueous solutions used as coolants in machining centers and those used as cleaning fluids to wash metal parts, such as hot jet spray washers.

If tramp oil is allowed to accumulate in a coolant or washer system it will cause operating problems, such as machine down time, increased tool wear and cleaning and filtering problems. Preventive maintenance and good housekeeping practices help reduce tramp oils, but they are never completely eliminated. Tramp oils in a coolant or washer system must be economically removed to extend fluid life and reduce or eliminate the problems caused by tramp oil contamination.

Coolants used in computer numerically controlled (CNC) machining centers and in hot jetspray washers commonly have problems associated with tramp oil collecting in the coolant solution. The major problem is that after a limited number of hours of use, the coolant solution must be discarded as hazardous waste because the tramp oil cannot be removed efficiently. In the early 1980's many CNC machines were converted to synthetic coolants. These coolants are located on the CNC machines in compact coolant tanks located below a work table in the machine, which makes it impossible to mount conventional oil skimmers without major modifications. Tramp oil reduces the cutting and cooling qualities of a coolant to the point that it must be drained and handled as a hazardous waste, which is very expensive to CNC operating companies. As a consequence, most CNC machine users return to the cheaper soluble oil coolant that requires frequent draining due to the tramp oil problem.

Hot jetspray washers clean motors, transmissions, and other dirty parts in a wide range of industries. They use aqueous cleaning solutions at high temperatures to scrub the contaminated material from the parts. As with CNC machines, a solution tank is located under the cleaning chamber where oil and grease emulsify with solution until it doesn't clean and must be disposed of as hazardous waste. Tank location and the violent water surface inside the storage tank prohibit conventional oil skimmers from being used.

Conventional oil skimmers fall into four categories. Disk skimmers require relatively calm surfaces, and constant liquid level to work well. When installed on a hot jetspray washer, these skimmers produce less than desirable results. Operators find it difficult to maintain liquid level high enough for the disk to reach tramp oil yet not have a problem with foam pouring out when the washer is in use. The typical disk type skimmer is found in U.S. Pat. No. 4,642,185, issued to Turner, et al. Another type of skimmer is a belt skimmer, typified by those disclosed in U.S. Pat. No. 4,642,372, issued to Threadgill, and U.S. Pat. No. 4,614,582, issued to Campitelli, distributed by Master Chemical Corporation, Perrysburg, Ohio. The smallest of these belt type skimmers is over three feet tall and is unacceptable for the high temperatures of hot jetspray washers. Liquid height in hot jetspray washers is 12 to 18 inches and 6 to 8 inches in CNC machines.

Further types of oil skimmers include floating tube or mop-rope type skimmers. These types of skimmers work well in large coolant systems, ponds, lakes, rivers or oceans but their size prohibits use in hot jetspray washers and CNC machines. A floating tube type skimmer is distributed by Oil Skimmers, Inc., Cleveland, Ohio. An oil mop type skimmer is disclosed in U.S. Pat. No. 3,748,682, issued to Rhodes, and distributed by Oil Mop, Inc., Belle Chasse, La.

A still further type of oil skimmer is the weir type skimmer which may be further broken down into stationary weir and floating suction weir concepts. The stationary weir concept works well with constant liquid height. However, the violent action inside a hot jetspray washer causes as much cleaning solution to be removed as oil. Also, the low height of CNC coolant tanks eliminates their use since they depend on gravity to drain off oils. The floating suction weir type on the other hand works well in calm systems removing up to 99% of the oil, but also removes far too much water in the violent action of a hot jetspray washer. The removed oil must be further processed to reduce water content. The floating suction weir type of oil skimmer is disclosed in U.S. Pat. No. 3,970,556 issued to Gore, and distributed by Douglas Engineering, Concord, Calif., and a similar type unit is distributed by Megator, Pittsburgh, Penna. The major problem with the floating type weirs is that they are larger than the liquid tank on most CNC or hot jetspray washer machines.

Prior to the subject matter of the present invention, the inventor herein tried to perfect a filtration and oil skimming unit for hot jetspray washers. The design used both belt and disk skimmers in a sidemount tank to replace the original disk skimmers. Through trial and error, the proper type of motor, disk and belt material were found for use in the 180° to 240° F. temperature range. However, while sidemount skimmers removed the oil, they had problems of heat loss and foam running out of the tank.

CNC machines and hot jetspray washers have one thing in common, a drain plug. It would be advantageous if this drain plug could be utilized to extend the production life of oil based, semi-synthetic and synthetic coolants and alkaline wash waters by removing free floating, disbursed and loosely emulsified tramp oils from the coolant reservoir or central system. It would further be advantageous to provide a tramp oil removal system that could operate not through the drain plug but over the side of the tank. It would also be advantageous if the oil removal system would work with other types of oils such as removing crude oil from oceans caused as a result of large oil spills in conjunction with other oil removing apparatus such as oil booms.

SUMMARY OF THE INVENTION

A novel system and method for removing tramp oil from aqueous coolants has been devised comprising a dual directional transfer pipe between a main tank and a separator tank. This dual directional transfer connection pipe utilizes a mechanical suction line inside a larger gravity return connector pipe to allow oil in the main tank to be removed by a floating or stationary weir and to be placed in a separator tank for skimming by an oil separator of any of the conventional types such as weir, disk, belt or rope. A motor and suction pump mounted on a separator tank can be sized and utilize any power source necessary to move floating material or oil from the main tank or source to the separator tank.

The dual direction transfer connector system simplifies the use of separating equipment on computerized lathes in machining centers, hot jetspray washers, any tank or liquid source that has or can have a drain plug installed or that can be accessed, or large body of fluid such as a pond or ocean.

DESCRIPTION OF THE PREFERRED EMBODIMENT

Figure 1:
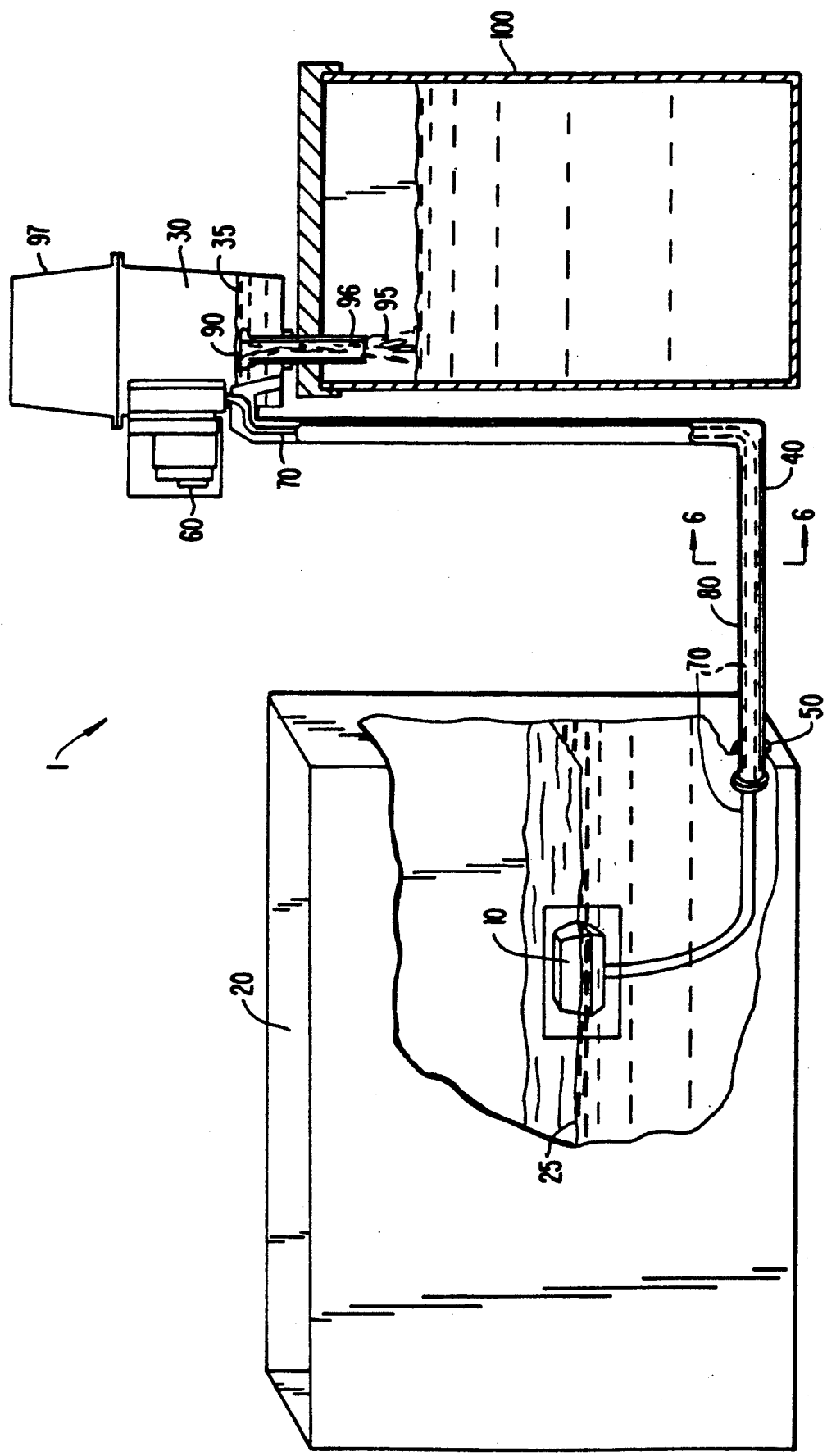
FIG. 1 is a schematic partially cut-away view of a dual direction transfer system for tramp oil collection of the present invention utilizing a floating oil skimmer in a main tank and a stationary weir type skimmer in a separator tank.
Figure 2:
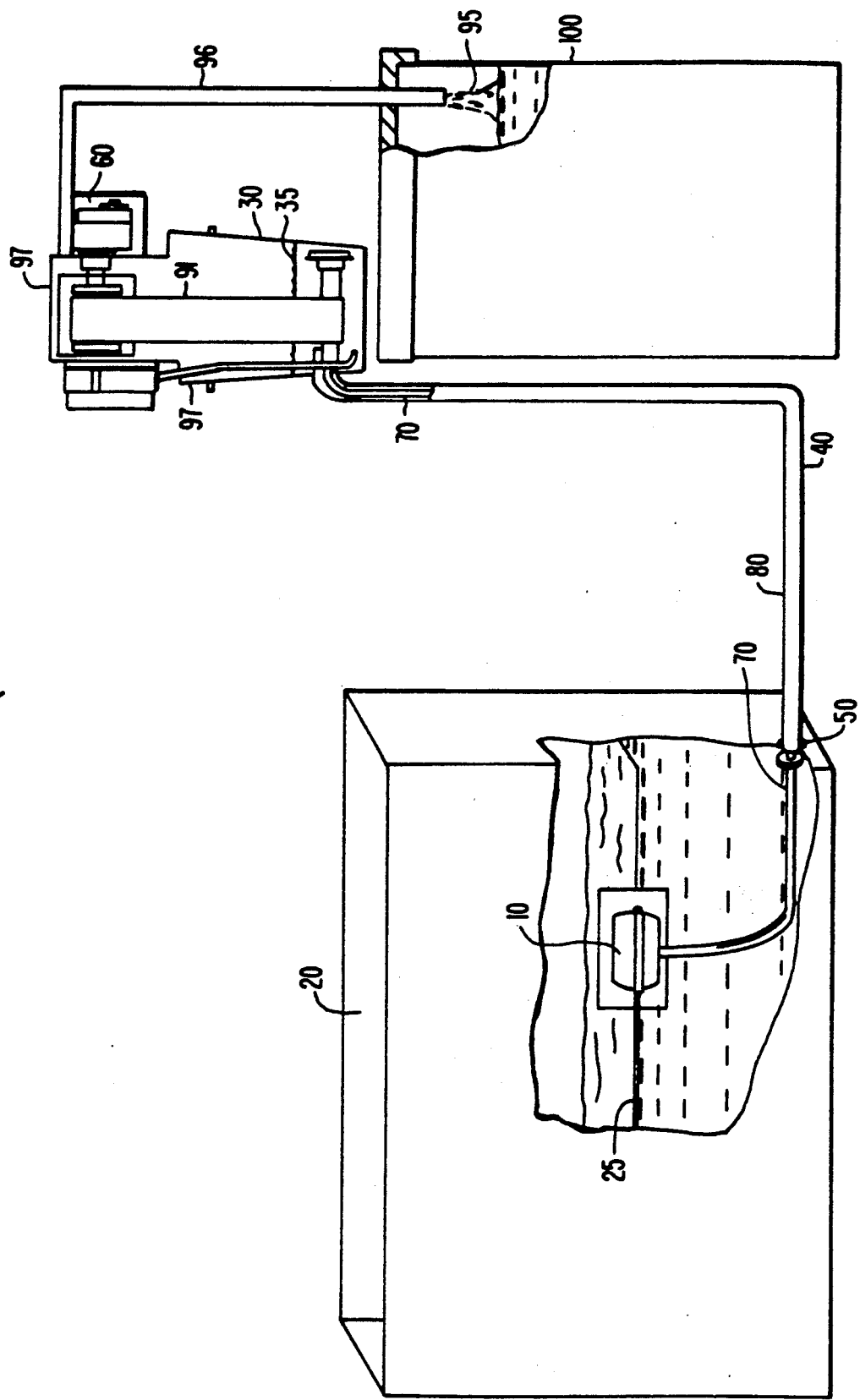
FIG. 2 also shows a dual direction transfer system of the present invention wherein a belt type skimmer is used to skim oil from the separator tank.
Figure 3:
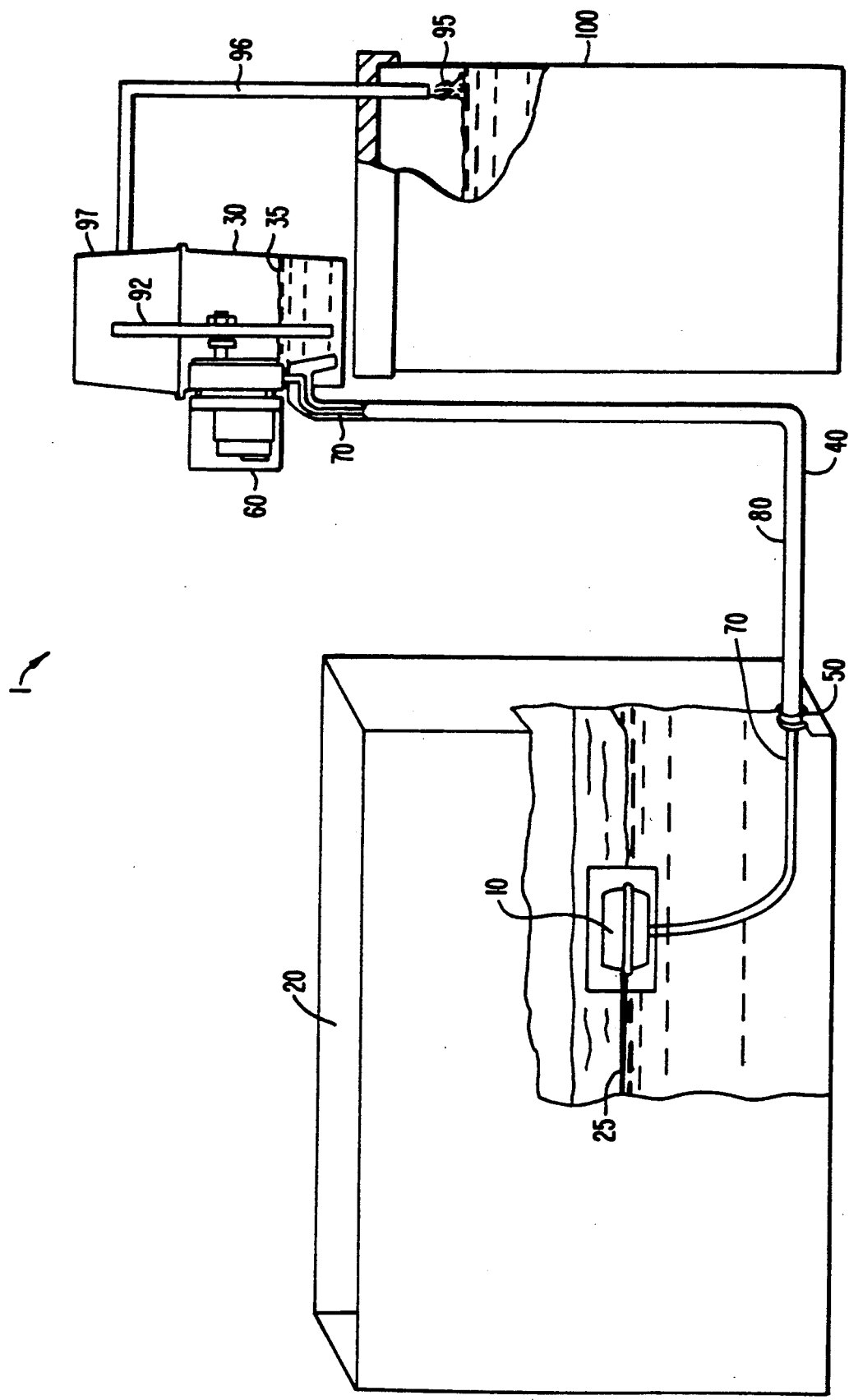
FIG. 3 is another view of a dual direction transfer system wherein a disk type skimmer is used as the separating apparatus.

The dual direction transfer system of the present invention, shown generally as 1 in FIGS. 1-4, uses a floating or stationary weir 10 in the preferred embodiment, inside the main tank 20 having a turbulent and/or non-constant level 25. As used herein, the word "turbulent" is meant to mean a liquid which has a not-calm surface and which is not readily processed by conventional type skimmers. A separator tank 30 above the liquid level 25 of main tank 20 is connected by dual directional transfer pipe 40 to drain 50 of main tank 20. As can be seen in reference to FIGS. 1-4, a suction pump 60 mounted on the separator tank 30 is connected to the weir 10 by a pick-up hose 70 which is inside a larger connector pipe 80 between main tank 20 and separator tank 30. This allows oil depleted liquid to return through connector pipe 80 to the main tank 20 by gravity. In the preferred embodiment, the connector pipe 80 and the pick-up hose 70 comprise the dual direction transfer pipe 40, although it is within the scope of the present invention to provide other methods of providing dual transfer in the same connector.

The dual direction transfer pipe 40 provides a calm surface, constant height oil level 35 in separator tank 30 for use of stationary weir 90 (FIG. 1), belt 91 (FIG. 2), or disk 92 (FIG. 3) type skimmer concepts. Separated oil 95 flows through connections appropriate for each skimmer concept to recycle tank 100. These connectors vary in location and shape but are generally shown as 96 in FIGS. 1-4. Dual directional transfer pipe 40 can be located where space permits, which is a great advantage in, for example, CNC machining centers. Separator tank 30 can be fitted with a closed cover 97 which reduces heat loss when the skimmer system is used for separating oil from aqueous fluids in hot jetspray washers.

Separator tank 30 can be located on. recycle tank 100 for shipping by the oil recycler. Dual directional transfer pipe 40 can also be used in off-shore spills with many of the prior art oil skimmers now in use by mounting separator tank 30 onto a recovery barge. The use of this dual directional system will typically decrease the water content of oil at least by 5 to 10 over conventional systems (that is, systems not using a dual directional transfer pipe and separator tank).

Figure 4:
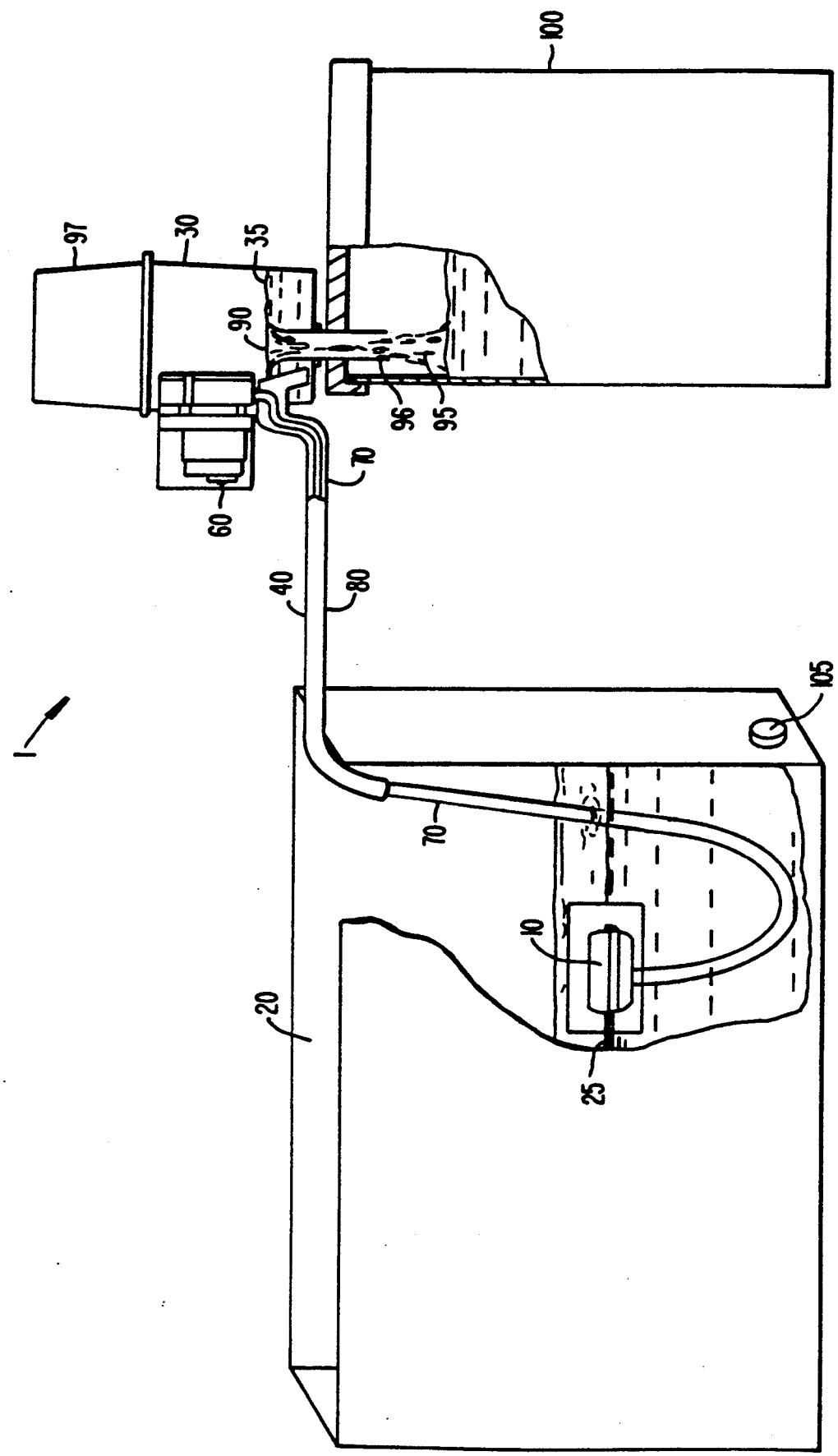
FIG. 4 discloses another embodiment of the dual direction transfer system of the present invention wherein a drain plug is not used.

FIG. 4 shows another embodiment of the present invention wherein the dual directional transfer pipe 80 is not fitted onto a drain plug 105 of main tank 20. In many cases there either is not a drain plug or the drain plug that is in place cannot be removed due to space and/or corrosion limitations. In this case, dual direction transfer pipe 80 may be placed with suction pick-up 70 over the side or through the top of main tank 20 with floating weir pick-up 10 attached at the end thereof. FIG. 4 shows a stationary weir type oil skimmer 90 in separator tank 30 skimming the oil level 35 in separator tank 30; however, it will be understood by those skilled in the art that the other oil separator devices as in FIGS. 2 and 3 can also be used.

Figures 5A, 5B:
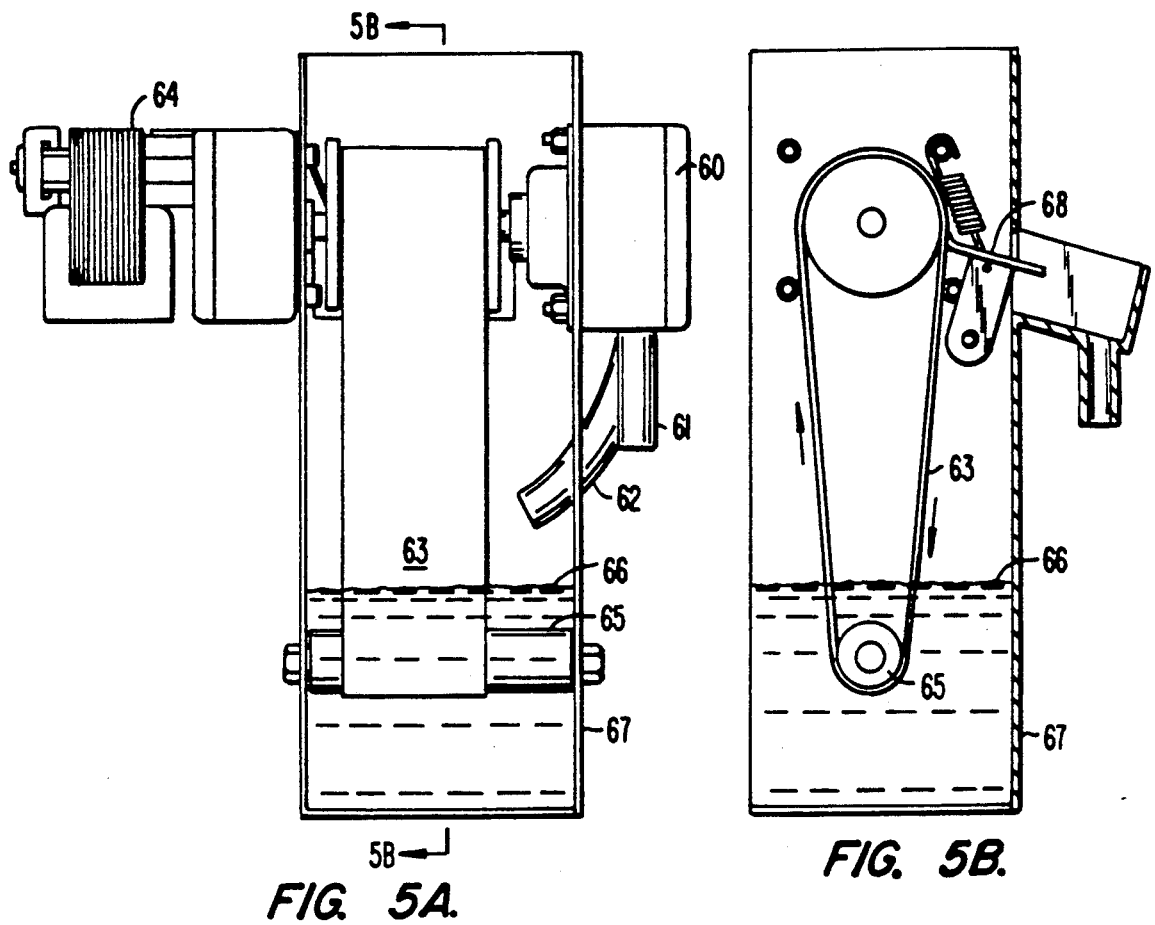
FIG. 5 shows two side elevation views of a belt type skimmer as used in the present invention for oil separation.

FIG. 5 shows side elevation views of a typical belt skimmer which may be used in separator tank 30 to effect oil separation. Referring specifically to FIG. 5A, suction pump unit 60 has suction connection 61 and discharge connection 62 attached. Suction connection 61 would be attached to pick-up hose 70 in the dual direction transfer systems of FIGS. 1-4. Also shown in FIGS. 5A and 5B is the belt skimmer itself 63, prime mover 64, and roller 65. As shown in both FIGS. 5A and 5B, the surface 66 is relatively calm compared with the turbulent and/or non-constant level surface 25 of main tank 20 of FIGS. 1-4. Also shown is separator tank 67, spring loaded scraper 68 (FIG. 5B) which is used to scrape oil from the moving belt. After oil is skimmed from the belt by scraper 68, the oil traverses exit connection 69 and into a recycle tank (not shown). It will be appreciated that disk, belt, tube and rope type skimmers operate using the same concepts as this belt type skimmer differing only by their respective physical geometries and scraper systems.

Figure 6:
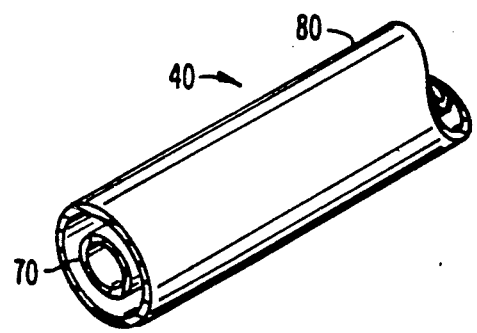
FIG. 6 discloses a perspective partially cutaway view of one embodiment of a dual direction transfer connection as used in the present invention consisting of a pipe within a pipe.

Referring now to FIG. 6, a preferred embodiment of the dual direction transfer connection is shown as a pipe within a pipe. Specifically, pick-up hose 70 is of smaller diameter than connector pipe 80, and in the preferred embodiment of the present invention pick-up hose 70 is of small enough diameter relative to connector pipe 80 that fluid may pass through dual directional transfer connector 40 in two directions, an oily aqueous mixture through suction hose 70, and a relatively oil free solution through connector pipe 80. It will be understood by those skilled in this art that the dual directional transfer pipe 40 can be constructed in numerous configurations and still be within the scope of this invention. For example, connector pipe 80 may in fact be separated into two or more compartments on the internal side of connector pipe 80. These embodiments are considered to be within the scope of this invention.

The material used as dual direction transfer connection pipe can be any material that is inert to the application fluids and can withstand variations in temperature and pressure. For example, pick-up hose 70 and connector pipe 80 can be steel, rubber, or plastic, such as PVC. Pick-up hose 70 and connector pipe 80 can be the same or different in material composition.

A dual directional transfer system of the present invention allows transfer of an oily liquid from a source such as a tank or pond through a connector pipe usually by means of a smaller pipe inside of the connector pipe. An oil-free or substantially oil-free fluid may then flow through in the opposite direction by gravity to the main tank, pond or ocean. The system works on closed top tanks wherein floating oil is a problem that cannot be solved by prior art direct mounted skimmers. The system is not limited to size or volume of liquid to be transferred and can be mounted to the drain plug or over the side of the main tank. The dual directional transfer connector pipe improves prior art belt, disk, mop or tube skimmers by providing a calm surface in a separator tank. Further, the dual directional transfer connector pipe can be used with prior art floating weir skimmers on large oil spills at sea.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A dual direction transfer system of the type having a main tank and a separator tank for removing oil from aqueous liquids comprising:
    a main tank for containing an aqueous oily mixture and including means for skimming oil from said mixture;
    a separator tank located so that its liquid level is above the liquid level of the main tank, the separator tank providing an oil rich phase and an oil depleted phase;
    a dual direction transfer pipe connecting said main tank and said separator tank and through which flows the aqueous oily mixture and oil depleted phase in opposite directions, said pipe comprising a pair of substantially concentric pipes; and
    means for forcing the aqueous oily mixture from the main tank to the separator tank through said dual direction transfer pipe, while said oil depleted phase moves under force of gravity to the main tank.

2. A system in accordance with claim 1 wherein said system further comprises an oil skimmer located in the separator tank for providing said oil rich phase and oil depleted phase.

3. A system in accordance with claim 2 wherein said oil skimmer is selected from the group consisting of the belt, weir, disk, tube, or rope type.

4. A system in accordance with claim 1 wherein the dual direction transfer pipe is connected to a drain of the main tank.

5. A system in accordance with claim 1 wherein the dual direction transfer pipe is mounted over the side of the tank.

6. A system in accordance with claim 1 wherein said means for forcing the aqueous oily mixture from the main tank to the separator tank is an electric motor driven pump.

7. A system in accordance with claim 1 wherein said main tank is a coolant tank on a lathe and said aqueous oily mixture is tramp oil in coolant used with the lathe.

8. A system in accordance with claim 1 wherein said main tank is a hot jet spray washer tank and said aqueous oily mixture is oil in wash water used with the washer.

9. A method of separating oil from an aqueous solution which includes first skimming oil from a source of the solution and further separating oil and water from the oil gathered from the source in a separator tank, the separator tank providing a calm surface for the separation comprising:
    a) transferring a first oil enriched liquid from a source of aqueous oily liquid using means for skimming oil from the surface of said source, through a sural direction transfer connection to a separator tank, said separator tank providing a calm liquid surface having a level above the level of the surface of the source, said dual direction transfer connection comprising a pair of substantially concentric pipes; and
    b) separating oil from the first oil enriched liquid while the oil depleted portion of the first oil enriched liquid flows back to the source through the dural direction transfer connection by gravity.

10. A method in accordance with claim 9 wherein said separating step further comprises skimming the surface of the first oil enriched separator tank, said separator tank having a surface substantially more calm than the surface of the liquid from the source.

11. A method in accordance with claim 9 wherein said aqueous oily liquid comprises a mixture of coolant used in lathe machines and tramp oil.

12. A dual direction transfer system for removing oil from an oily water source of the type including a separator tank mounted to an oil collection tank, and an oil skimmer on the source surface comprising:
    a separator tank having its level above that of the source level, the separator tank mounted on a portable oil collection tank;
    a dual direction transfer pipe connecting the oil skimmer on the surface of the source with the separator tank, the pipe comprising a pair of substantially concentric pipes;
    means for forcing oily water from the oil skimmer on the surface of the source to said separator tank through said dual direction transfer pipe; and
    means for separating oil from the oily water, said means located in said separator tank; wherein the non-oil portion of the source is returned to the source by gravity through the dual direction transfer pipe.

13. A system in accordance with claim 12 in which said means for separating oil in said separator tank comprises a skimmer selected from the group consisting of weir, disk, belt, tube, and rope types.

14. A system in accordance with claim 12 in which said means for forcing oily water from the oil skimmer on the surface of the source to the separator tank is a motor driven pump.

* * * * *